US010060770B2

(12) United States Patent
Goll et al.

(10) Patent No.: US 10,060,770 B2
(45) Date of Patent: Aug. 28, 2018

(54) ROTATIONAL SPEED SENSOR WHICH IS INSTALLED IN A MECHANICALLY OVERDETERMINED MANNER WITH AN ELASTIC INJECTION-MOULDED ENCAPSULATION

(71) Applicant: Continental Teves AG & Co. oHG, Frankfurt (DE)

(72) Inventors: Manfred Goll, Glauburg (DE); Ulrich Schrader, Wöllstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 51 days.

(21) Appl. No.: 15/034,631

(22) PCT Filed: Oct. 8, 2014

(86) PCT No.: PCT/EP2014/071587
§ 371 (c)(1),
(2) Date: May 5, 2016

(87) PCT Pub. No.: WO2015/090664
PCT Pub. Date: Jun. 25, 2015

(65) Prior Publication Data
US 2016/0282154 A1    Sep. 29, 2016

(30) Foreign Application Priority Data

Dec. 16, 2013  (DE) .......................... 10 2013 226 045

(51) Int. Cl.
*G01D 11/24* (2006.01)
(52) U.S. Cl.
CPC .................. *G01D 11/245* (2013.01)
(58) Field of Classification Search
CPC .............................. G01D 11/245; G01D 11/24
(Continued)

(56) References Cited

U.S. PATENT DOCUMENTS

| 4,849,728 A | 7/1989 | Goll et al. |
| 5,737,188 A | 4/1998 | Flierl |

(Continued)

FOREIGN PATENT DOCUMENTS

| CN | 1253696 C | 4/2006 |
| CN | 102171536 A | 8/2011 |

(Continued)

OTHER PUBLICATIONS

German Search Report for German Application No. 10 2013 226 045.8 dated Dec. 15, 2014, including partial translation.

(Continued)

*Primary Examiner* — Daniel S Larkin
*Assistant Examiner* — Anthony W Megna Fuentes
(74) *Attorney, Agent, or Firm* — RatnerPrestia

(57) ABSTRACT

A sensor for outputting a sensor signal which is dependent on a variable to be measured, including: —a measuring pickup which is connected electrically to a data line at a connecting point, is housed in a measuring pickup housing and is set up to feed the sensor signal which is dependent on the variable to be measured into the data line, with the result that the sensor signal can be output via the data line, an installation housing which houses the measuring pickup housing and the data line at least at the connecting point and is manufactured from a flexible material, and—a fastening element which is connected fixedly to the installation housing for fastening the installation housing to a sensor holder, wherein the measuring pickup housing; and the fastening element are arranged on two sides of the installation housing which lie opposite one another.

8 Claims, 5 Drawing Sheets

(58) Field of Classification Search
USPC .................................................. 73/431, 866.5
See application file for complete search history.

(56) References Cited

U.S. PATENT DOCUMENTS

| | | | |
|---|---|---|---|
| 5,921,633 A | 7/1999 | Neibling | |
| 6,157,186 A | 12/2000 | Aoki | |
| 6,844,719 B2* | 1/2005 | Tsuge | G01P 1/026 |
| | | | 324/174 |
| 7,028,568 B2 | 4/2006 | Tokunaga et al. | |
| 7,233,141 B2 | 6/2007 | Fouquet | |
| 7,385,394 B2 | 6/2008 | Auburger | |
| 8,820,160 B2 | 9/2014 | Doering | |
| 9,014,921 B2 | 4/2015 | Bretzigheimer et al. | |
| 9,029,702 B2 | 5/2015 | Steinbrink et al. | |
| 9,061,454 B2 | 6/2015 | De Volder et al. | |
| 9,266,267 B2 | 2/2016 | DeVolder | |
| 2004/0118227 A1* | 6/2004 | Tokunaga | B29C 70/72 |
| | | | 73/866.1 |
| 2004/0134555 A1* | 7/2004 | Powell | B32B 1/08 |
| | | | 138/141 |
| 2004/0201464 A1 | 10/2004 | Oonishi | |
| 2005/0115317 A1 | 6/2005 | Fouquet | |
| 2007/0001664 A1 | 1/2007 | Steinbrink | |
| 2011/0277570 A1* | 11/2011 | Lee | G01D 11/245 |
| | | | 73/866.5 |
| 2012/0198933 A1* | 8/2012 | Steinbrink | G01D 11/245 |
| | | | 73/494 |
| 2012/0247270 A1 | 10/2012 | Ikemori et al. | |
| 2012/0306484 A1* | 12/2012 | Mizutani | G01D 5/145 |
| | | | 324/244 |
| 2013/0044437 A1 | 2/2013 | Hortig | |
| 2014/0053646 A1* | 2/2014 | Takasaki | G01D 11/245 |
| | | | 73/431 |
| 2014/0077816 A1 | 3/2014 | Bruendel | |

FOREIGN PATENT DOCUMENTS

| | | |
|---|---|---|
| CN | 102549392 A | 7/2012 |
| CN | 103153729 A | 6/2013 |
| CN | 103175598 A | 6/2013 |
| DE | 4405438 | 8/1995 |
| DE | 4436523 | 4/1996 |
| DE | 19537808 | 4/1997 |
| DE | 102004011100 | 9/2005 |
| DE | 102005027767 | 12/2006 |
| DE | 202008004908 | 10/2008 |
| DE | 102007050988 | 4/2009 |
| DE | 102008064047 | 4/2010 |
| DE | 102009000428 | 7/2010 |
| DE | 102011080789 | 2/2012 |
| DE | 102010063614 | 6/2012 |
| DE | 102011002741 | 7/2012 |
| DE | 102011003239 | 8/2012 |
| DE | 102011081016 | 2/2013 |
| DE | 102011081012 | 3/2013 |
| DE | 102012216563 | 3/2014 |
| EP | 0740365 | 10/1996 |
| GB | 8307498 | 4/1983 |
| WO | 03081260 | 10/2003 |
| WO | 2010037810 | 4/2010 |

OTHER PUBLICATIONS

International Search Report and Written Opinion of the International Searching Authority for International Application No. PCT/EP2014/071587 dated Dec. 18, 2014.
European Office Action for European Application No. 14 783 596.1, dated Jul. 25, 2017, including English translation, 8 pages.
Chinese Office Action for Chinese Application No. 201480068236.7, dated May 2, 2017, 6 pages.
Chinese Office Action for Chinese Application No. 201480068236.7, dated Jan. 2, 2018, including English translation, 15 pages.

* cited by examiner

ROTATIONAL SPEED SENSOR WHICH IS INSTALLED IN A MECHANICALLY OVERDETERMINED MANNER WITH AN ELASTIC INJECTION-MOULDED ENCAPSULATION

CROSS REFERENCE TO RELATED APPLICATIONS

This application is the U.S. National Phase Application of PCT International Application No. PCT/EP2014/071587, filed Oct. 8, 2014, which claims priority to German Patent Application No. 10 2013 226 045.8, filed Dec. 16, 2013, the contents of such applications being incorporated by reference herein.

FIELD OF THE INVENTION

The invention relates to a sensor for outputting a sensor signal which is dependent on a variable which is to be measured, and to a vehicle comprising the sensor.

BACKGROUND OF THE INVENTION

WO 2010/037 810 A1, which is incorporated by reference discloses a sensor for outputting a sensor signal which is dependent on a variable which is to be measured. The sensor comprises a measurement pickup which is electrically connected to a data line at a connection point and is designed to feed the sensor signal which is dependent on the variable which is to be measured into the data line, so that the sensor signal can be output via the data line. Furthermore, an installation housing which houses the measurement pickup and the data line at least at a connection point can be formed within the scope of a plastic injection-molding process, known as "transfer molding"

SUMMARY OF THE INVENTION

An aspect of the invention aims to improve the known sensor.

According to one aspect of the invention, a sensor for outputting a sensor signal which is dependent on a variable which is to be measured comprises a measurement pickup which is electrically connected to a data line at a connection point, is housed in a measurement pickup housing and is designed to feed the sensor signal which is dependent on the variable which is to be measured into the data line, so that the sensor signal can be output via the data line, an installation housing which houses the measurement pickup housing and the data line at least at a connection point and is produced from a flexible material, and a fastening element, which is fixedly connected to the installation housing, for fastening the installation housing to a sensor receptacle, wherein the measurement pickup housing and the fastening element are arranged on two opposite sides of the installation housing.

In this case, the flexible material can be a material with a specific modulus of elasticity. The flexibility of the material can also be prespecified by means of a compression set. This is the remaining deformation of the material which remains after deformation with a specific loading over a specific period of time and at a prespecified temperature. The test method used can be, for example, ASTM D395.

The specified sensor is based on the consideration that the sensor, as a wheel rotation speed sensor, could be fastened to an axle body of a vehicle by means of the fastening element and the installation housing in order to measure the wheel rotation speed of a wheel which is mounted in a rotatable manner on the axle body. In this case, the material used for the installation housing could be a rigid material, such as a polyamide for example, in order to prevent the measurement pickup housing and therefore the measurement pickup from being subjected to mechanical loading and therefore outputting a sensor signal, which is incorrectly dependent on the variable which is to be measured, on account of the mechanical load.

Furthermore, the specified sensor is based on the consideration that the sensor has to be fastened to such a rigid installation housing with a predetermined installation tolerance in relation to a wheel bearing in the axle body that the measurement pickup housing does not overlap with the wheel bearing and therefore mechanical stresses are applied to the installation housing, these mechanical stresses then acting on the measurement pickup. Mechanical stresses of this kind can be produced, for example, by temperature fluctuations in the other components and subject the installation housing to changes in load which can reach a number of up to two million over the service life of the housing. However, an air gap between the measurement pickup and a transmitter element is increased owing to the installation tolerance, this however increasing the tolerance range of the sensor signal and restricting a reading range of the measurement pickup at the same time.

Here, the specified sensor starts with the consideration that the measurement pickup housing itself is generally produced from a rigid material. This rigid material protects the measurement pickup against the abovementioned mechanical loads. Therefore, the installation housing can be produced from a flexible material which absorbs all mechanical loads which may occur owing to the installed state of the specified sensor, for example in a vehicle, and keeps said mechanical loads away from the measurement pickup housing and therefore from the measurement pickup. Therefore, the sensor can be installed without installation tolerances, so that the abovementioned air gap can be reduced and therefore the reading range of the measurement pickup can be increased and the tolerance range of the sensor signal can be lowered.

In one development of the specified sensor, the flexible material is an elastomer which can be obtained at low cost and can be mass-processed.

In a particular development of the specified sensor, the elastomer has a Shore A hardness of at least 80 and is therefore suitable for providing, in addition to the abovementioned elasticity, a sufficient degree of resistance in relation to other mechanical loads. In this case, the elastomers used can particularly preferably be thermoplastic elastomers which can be plastically processed starting from a specific temperature to form the installation housing.

In another development of the specified sensor, the installation housing extends from the measurement pickup housing in a direction of the data line around the data line in the manner of a rod. If the sensor is fastened, for example, to the abovementioned axle body of the vehicle, the sensor can be fastened to an outer side of the axle body of the vehicle and, owing to its rod-like design of the installation housing, can be inserted into an interior space in the axle body via an opening.

In an additional development of the specified sensor, at least one bending groove is formed on the installation housing. In this case, the bending groove can be arranged in such a way that the installation housing has a preferred bending direction. In this case, the preferred bending direction should be defined such that the installation housing can absorb mechanical loads between two mounting points of the specified sensor which are situated on the fastening element and the measurement pickup housing. In this way, the preferred mechanical load absorption by the installation housing in relation to the measurement pickup housing can be further increased, as a result of which the mechanical loads on the measurement pickup housing and therefore the measurement pickup can be further reduced. In this case, two or more bending grooves are particularly preferably formed on the installation housing.

In a preferred development of the specified sensor, at least two crushing ribs which are placed in an axially symmetrical manner around the data line and can be deformed by the sensor receptacle are formed on the installation housing. In this way, the elastic material on the sensor receptacle can be stiffened by pinching the sensor receptacle, as a result of which the sensor is held in a stable manner on the sensor receptacle by means of the pinched and stiffened installation housing.

In a particularly preferred development of the specified sensor, the crushing rib is formed between the bending groove and the fastening element, so that it is ensured that the abovementioned mechanical loads also act on the bending groove and are kept away from the measurement pickup housing and therefore from the measurement pickup.

In order to further improve the process of diverting the abovementioned mechanical loads away from the measurement pickup housing and therefore from the measurement pickup, the data line can be flexible at least in the region of the connection point in the specified sensor.

In a particularly preferred development of the specified sensor, the measurement pickup housing, which is expediently designed to be rigid in the abovementioned manner, can be produced from a synthetic resin, in particular from an epoxy resin.

According to a further aspect of the invention, a vehicle comprises an axle body which is fastened to a chassis, a wheel which is fastened in a rotatable manner to the axle body by means of a wheel bearing, and one of the specified sensors, the fastening element and the measurement pickup housing of said sensor correspondingly being fastened to the axle body or to an element of the wheel bearing, said element being fixed in position in relation to the axle body.

BRIEF DESCRIPTION OF THE DRAWINGS

The above-described properties, features and advantages of this invention and the way in which they are achieved will become clearer and more clearly understood in connection with the following description of the exemplary embodiments which are explained in more detail in connection with the drawings, in which.

DETAILED DESCRIPTION OF THE PREFERRED EMBODIMENTS

In the figures, identical technical elements are provided with identical reference symbols and are described only once.

Figure 1:
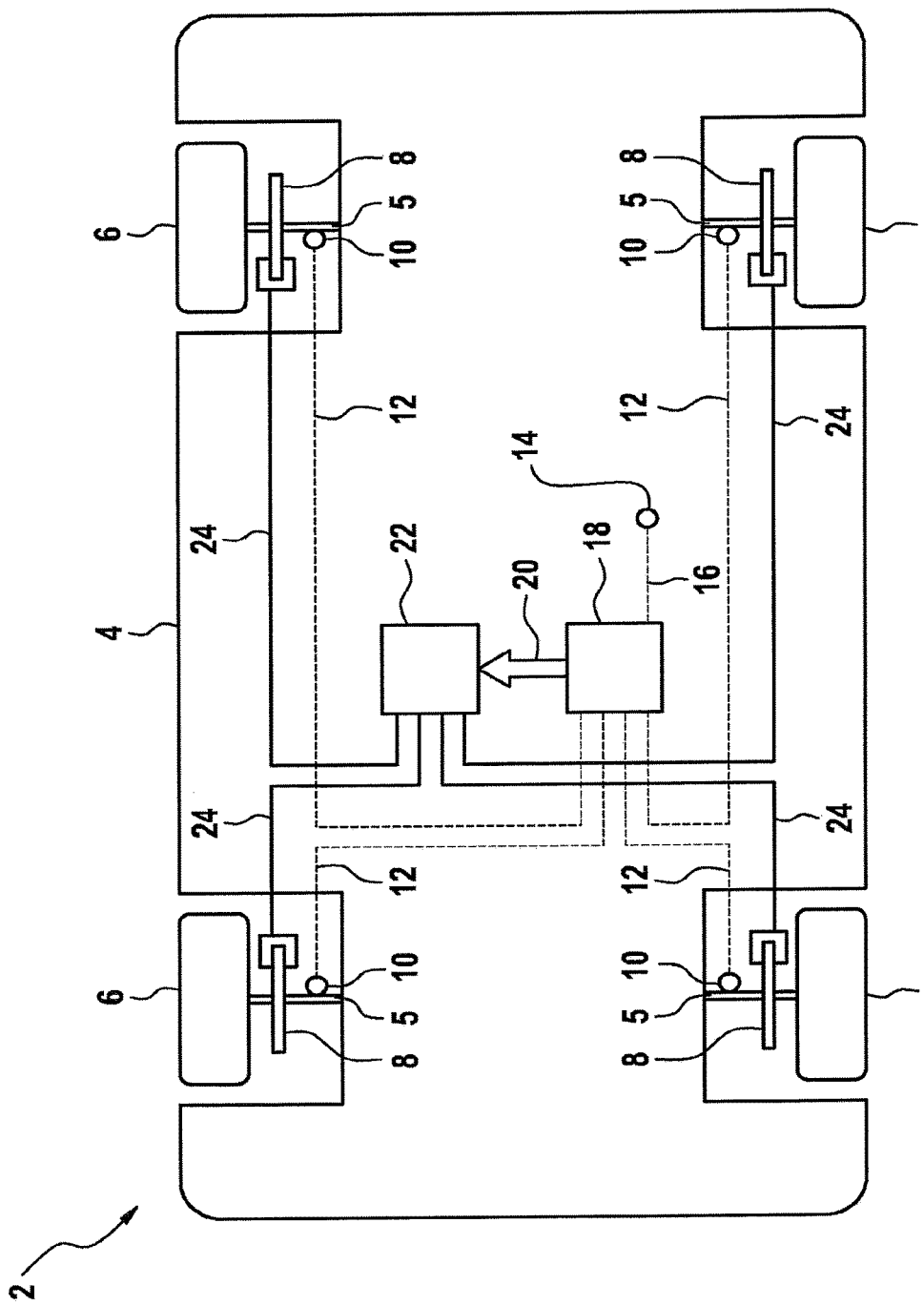
FIG. 1 shows a schematic view of a vehicle having driving dynamics control.

Reference is made to FIG. 1 which shows a schematic view of a vehicle 2 having driving dynamics control which is known per se. Details of this driving dynamics control can be found in DE 10 2011 080 789 A1, which is incorporated by reference, for example.

The vehicle 2 comprises a chassis 4 and four wheels 6 which are each held in a rotatable manner on the chassis 4 by means of a wheel suspension arrangement 5. Each wheel 6 can be decelerated with respect to the chassis 4 by means of a brake 8 which is fastened to the chassis 4 in a fixed position, in order to decelerate a movement of the vehicle 2 on a road, not illustrated any further.

In this case, in a manner known to a person skilled in the art, the wheels 6 of the vehicle 2 may lose their grip on the road and the vehicle 2 may even move away from a trajectory which is prespecified, for example, by means of a steering wheel, not shown any further, as a result of understeering or oversteering. This is avoided using control circuits such as ABS (anti-lock braking system) and ESP (electronic stability program) which are known per se.

In the present embodiment, the vehicle 2 has rotation speed sensors 10 on the wheels 6 for this purpose, said rotation speed sensors detecting a rotation speed 12 of the wheels 6. The vehicle 2 also has an inertia sensor 14 which detects driving dynamics data 16 relating to the vehicle 2, from amongst which data a pitch rate, a roll rate, a yaw rate, a lateral acceleration, a longitudinal acceleration and/or a vertical acceleration, for example, can be output in a manner known per se to a person skilled in the art.

On the basis of the detected rotation speeds 12 and driving dynamics data 16, a controller 18 can determine, in a manner known to a person skilled in the art, whether the vehicle 2 is sliding on the road or even deviates from the abovementioned prespecified trajectory and can accordingly react thereto with a controller output signal 20 which is known per se. The controller output signal 20 can then be used by an actuating device 22 to control actuating elements, such as the brakes 8, which react to the sliding and the deviation from the prespecified trajectory in a manner which is known per se, by means of actuating signals 24.

The controller 18 may be integrated, for example, in an engine controller of the vehicle 2 which is known per se. The controller 18 and the actuating device 22 can also be in the form of a common control device and can be optionally integrated in the abovementioned engine controller.

The present invention is intended to be explained in more detail using the wheel rotation speed sensor 10 shown in FIG. 1, even though the present invention can be implemented in any desired electronic apparatuses and in particular in any desired sensors, such as magnetic field sensors, acceleration sensors, rate-of-rotation sensors, structure-borne sound sensors or temperature sensors.

Figure 2:
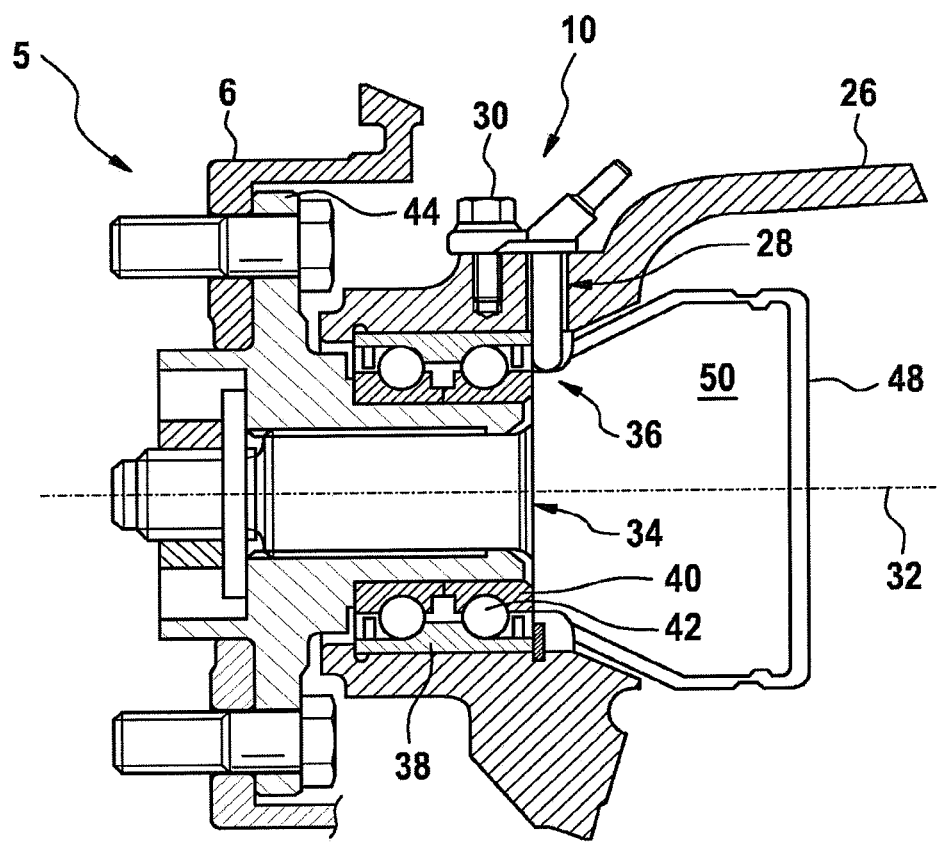
FIG. 2 shows a schematic sectional view through a wheel suspension arrangement in the vehicle of FIG. 1.

Reference is made to FIG. 2 which shows a schematic sectional view through one of the wheel suspension arrangements 5 in the vehicle 2 of FIG. 1.

The wheel suspension arrangement 5 has an axle body 26 which is fastened to the chassis 4 such that it is rotationally fixed in relation to the wheel 6 and possibly can be deflected by means of a steering arrangement. A receiving opening 28 is formed through the axle body 26, the rotation speed sensor 10 which is correspondingly arranged on the wheel suspension arrangement 5 being routed through said receiving opening. Said rotation speed sensor 10 will be discussed in detail at a later point. The rotation speed sensor 10 is fastened to the axle body 26 by means of a screw 30.

The axle body 26 has an inner bore 34 which runs concentrically around a rotation axis 32 and in which a wheel bearing 36 is held. The wheel bearing 36 is designed as a second-generation wheel bearing in the present embodiment. Wheel bearings of this kind are known in a technically relevant manner, for example, from DE 195 37 808 A1, which is incorporated by reference and for this reason the functioning of said wheel bearings does not need to be discussed further in the text which follows.

The wheel bearing 36 comprises an outer ring 38 which is held in the inner bore 34 of the axle body 26 in a rotationally fixed manner and comprises an inner ring 40 which is held in a rotatable manner in relation to the inner ring by means of roller elements 42. A wheel flange 44 extends axially on the inner ring 40, it being possible for the wheel 6 to be held on said wheel flange in a manner fastened by means of screws 30.

On that side of the wheel bearing 36 which is situated axially opposite the wheel flange 44, the inner bore 34 of the axle body 26 is covered by a cap 48, so that a space 50 into which the sensor 10 is inserted is formed. In the process, the rotation speed sensor 10 can be routed axially very close to the inner ring 40 which is generally fitted with an encoder 52, shown in FIG. 3, which excites a magnetic transmitter field which can be evaluated for the rotation speed sensor 10. In this case, the encoder 52 can optionally be added to the rotation speed sensor 10.

Figure 3:
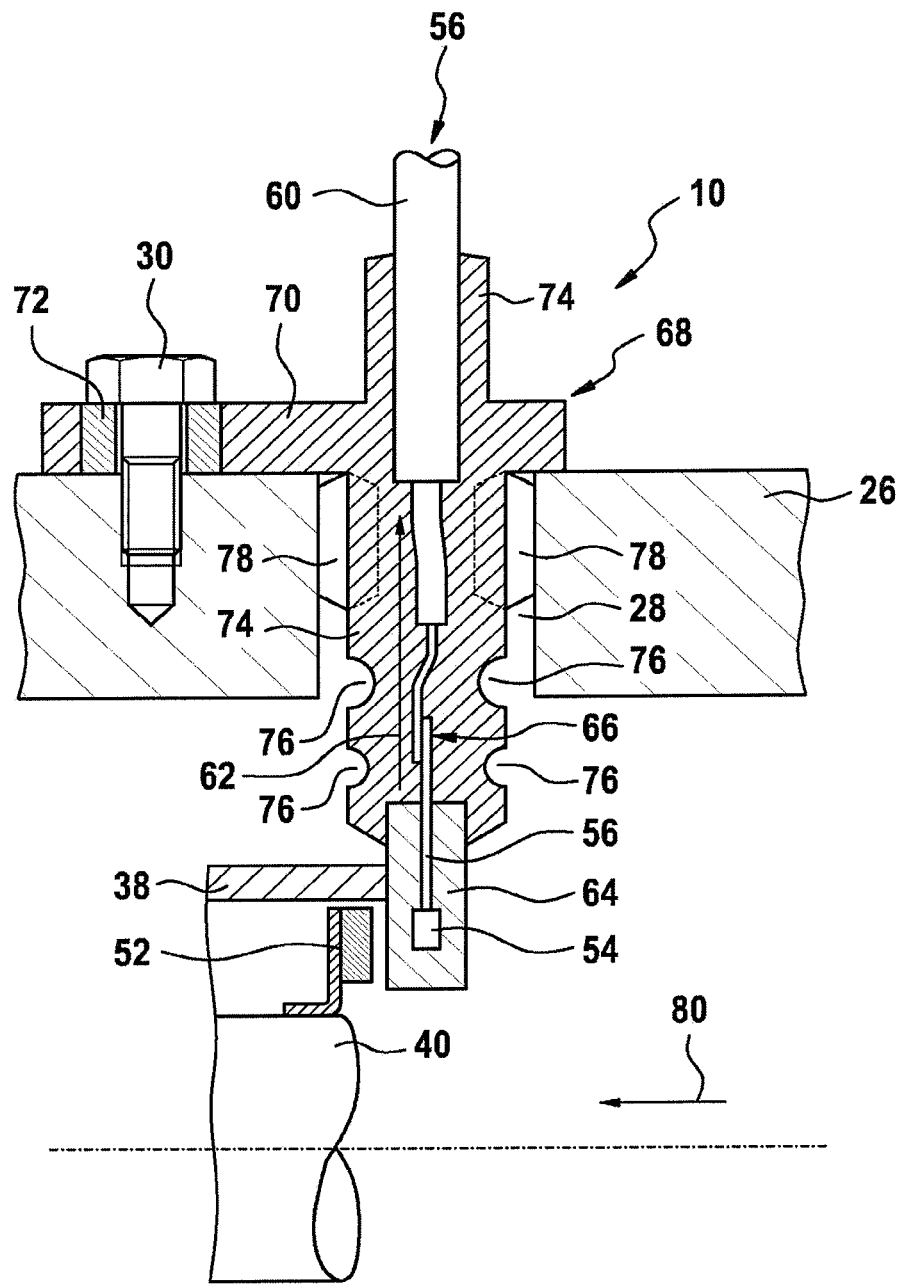
FIG. 3 shows a schematic sectional view through a rotation speed sensor in an installed state on the wheel suspension arrangement of FIG. 2.

Reference is made to FIG. 3 which shows a schematic sectional view of the rotation speed sensor 10 in an installed state on the wheel suspension arrangement 5 of FIG. 2.

The rotation speed sensor 10 has a measurement pickup 54 and a data line 56 which, in the present embodiment, is designed as pins 58 and as a data cable 60 which is connected to the pins 58. The data cable 60 can be connected to the controller 18, while the pins 58 are terminated at the measurement pickup 54, so that a rotation speed signal 62 which carries the rotation speed 12 can be conducted from the measurement pickup 54, via the pins 58 and the data cable 60, to the controller 18 for the abovementioned processing of the rotation speed 12.

In the present embodiment, the measurement pickup 54 is accommodated in a rigid measurement pickup housing 64 which can be produced, for example, from an epoxy resin. The pins 58 are routed out of this measurement pickup housing 64. The pins 58, the data cable 60 and the measurement pickup housing 64 are enclosed by an installation housing 68 at an electrical connection point 66 at which the data cable 60 is electrically connected to the pins 58. The installation housing can be produced, for example, from a thermoplastic material by injection molding around the data cable 60 and the measurement pickup housing 64.

The thermoplastic material should have a Shore A hardness of at least 80.

This installation housing 68 has a support plate 70 through which a fastening element 72 is routed, it being possible for the screw 30 to be routed through said fastening element. At the same time, the support plate 70 can be supported on the outer side of the axle body 28 as seen from the space 50, so that the rotation speed sensor 10 is held securely on the axle body 28 after the screw 30 has been screwed in.

A rod-like projection 74 through which the data line 56 is routed extends from the connection plate 70, through the receiving opening 28, in the direction of the data line 56. This rod-like projection 74 also partially encloses the measurement pickup housing 64. In this case, the rod-like projection 74 can also extend from the connection plate 70 on a side which is situated opposite the receiving opening 28.

Bending grooves 76 are formed in the rod-like projection 74 on the side of the receiving opening 28, said bending grooves weakening the rod-like projection 74 at this point, so that it can be bent more easily at these points. In the installed state shown in FIGS. 2 and 3, the rotation speed sensor 10 has two mechanical fastening points in the vehicle 2. Firstly, the rotation speed sensor 10 is fastened to the axle body 26 by way of its connection plate 70. Furthermore, the rotation speed sensor 10 is firmly supported on the outer ring 38 of the wheel bearing 36 by way of the measurement pickup housing 64. If the outer ring 38 of the wheel bearing 36 moves, for example owing to thermal movements, the rotation speed sensor 10 is primarily deformed at the bending grooves 76 of the rod-like projection 74 owing to the thermal movements. The measurement pickup 54 remains largely free of mechanical stress owing to the rigid measurement pickup housing 64.

In order to firmly hold the rotation speed sensor 10 in the receiving opening 28 on the rod-like projection 74, a collar 77 is formed on the rod-like projection 74 in the region of attachment to the connection plate 70, said collar being axially adjoined by a plurality of crushing ribs 78 which are placed around the periphery of the rod-like projection 74. When the rod-like projection 74 is inserted into the receiving opening 28, the rotation speed sensor 10 is initially radially centered by the collar 77. If the rod-like projection 74 is inserted further into the receiving opening 28, the crushing ribs 78 are deformed by pinching, so that the rotation speed sensor 10 is firmly supported on the axle body 26 within the receiving opening 28 too. Furthermore, the crushing ribs 78 can absorb mechanical stresses from the axle body 26, as can occur, for example, due to thermal movements of the axle body 26, so that the overall elastic effect of the rotation speed sensor 10 is further increased.

Whereas the crushing ribs 78 are routed axially on the rod-like projection 74 and can be placed around the periphery of said rod-like projection, the bending grooves 76 can be formed, for example, in a direction 80 which is directed toward the inner ring 38 and in the opposite direction in the rod-like projection 74 in order firstly to ensure a high degree of stability of the rod-like projection 74 but also to provide the rod-like projection 74 with a high degree of flexibility.

By virtue of the abovementioned embodiment of the rotation speed sensor 10, said rotation speed sensor can be fastened at different points in the vehicle 2 without thermal movements of the elements in the vehicle 2 and a resulting change in load on the rotation speed sensor 10 leading to mechanical loads on the measurement pickup 54 and corrupting the measured rotation speed 12 in the rotation speed signal 62.

Figure 4:
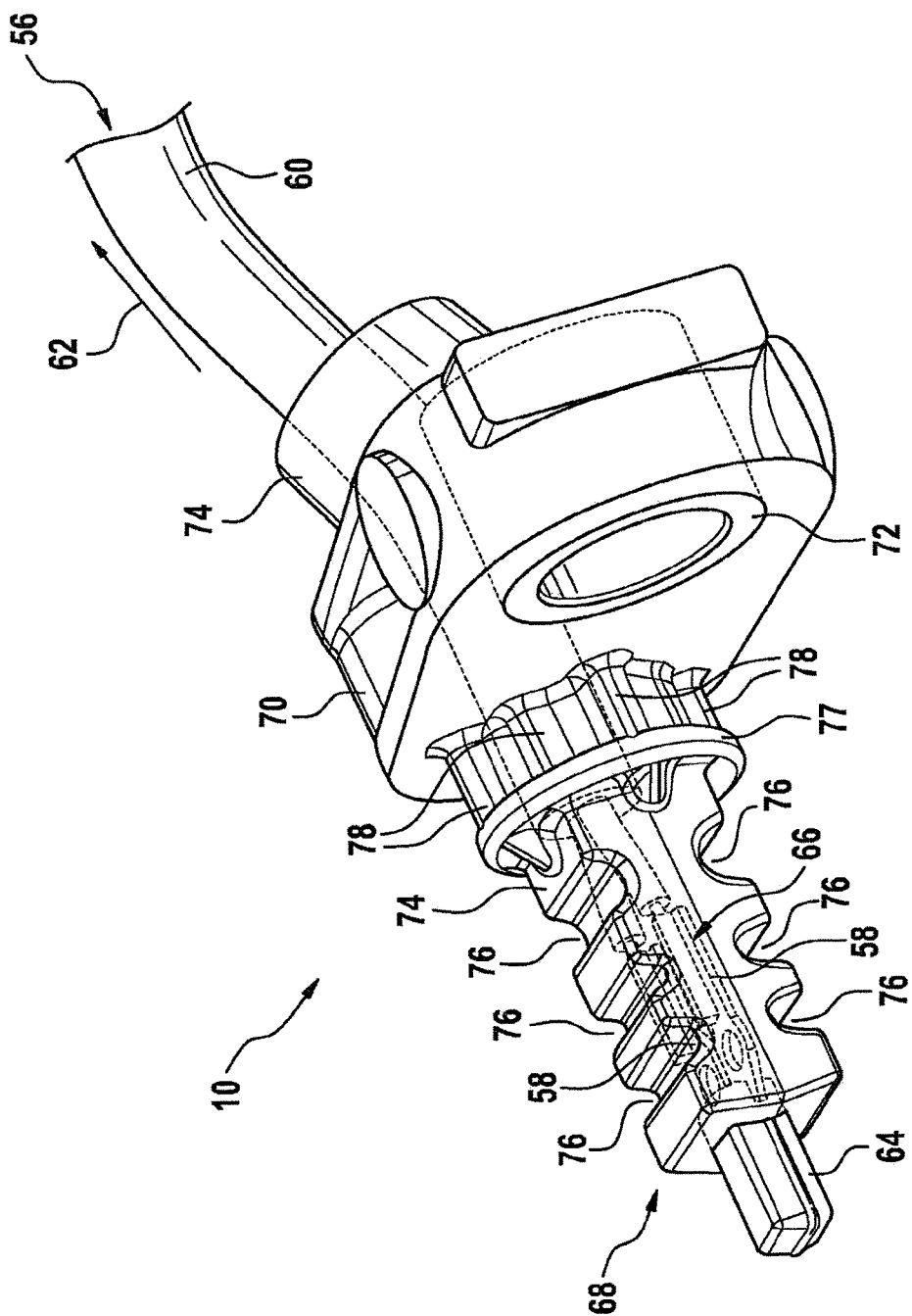
FIG. 4 shows a schematic view of an alternative rotation speed sensor.

Reference is made to FIG. 4 which shows a schematic view of a rotation speed sensor 10, which is an alternative to the rotation speed sensor 10 of FIG. 3, in a state in which it is not installed in the vehicle 2.

The rotation speed sensor of FIG. 4 has six bending grooves 76 instead of four bending grooves 76. The flexibility of the rod-like projection can be further increased in this way.

Figure 5:
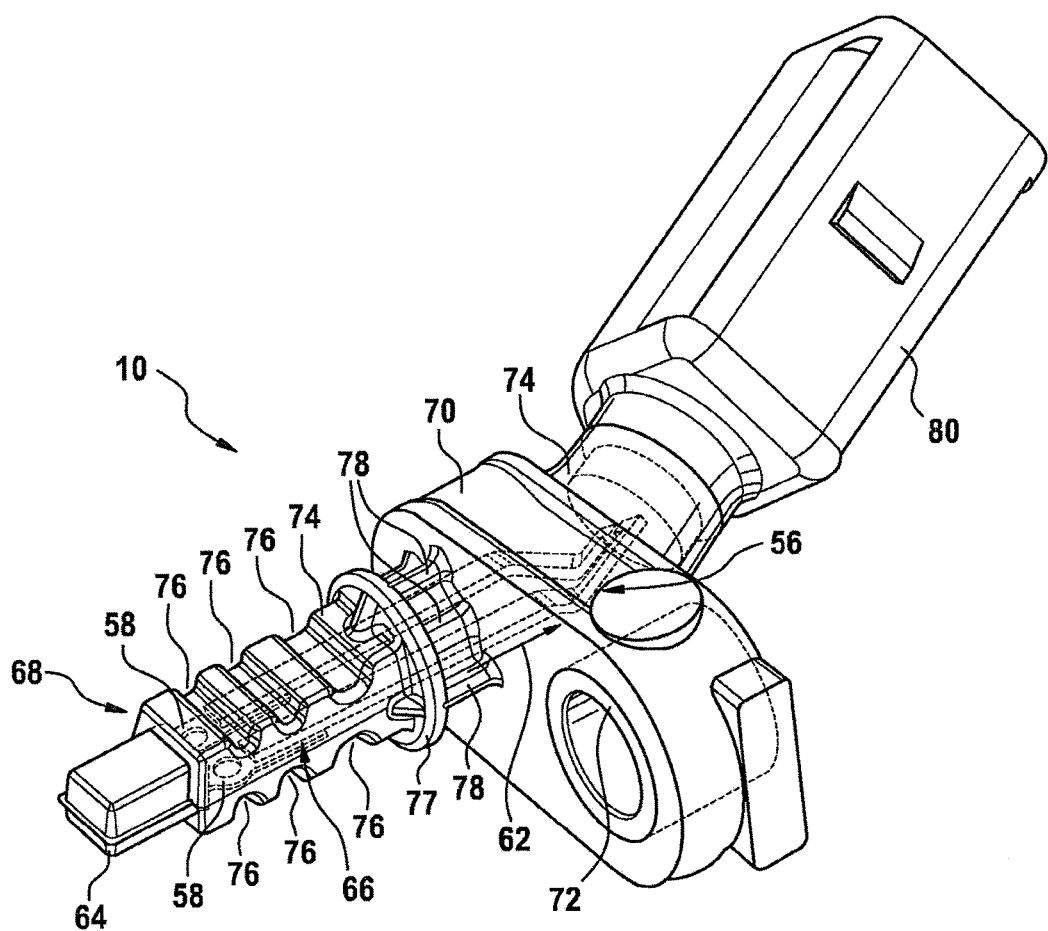
FIG. 5 shows a schematic view of a further alternative rotation speed sensor.

Reference is made to FIG. 5 which shows a schematic view of a further alternative rotation speed sensor 10.

The rotation speed sensor 10 of FIG. 5 corresponds substantially to the rotation speed sensor 10 of FIG. 4, wherein electrical contact is made with the pins 58 by a plug receptacle 80 instead of by a cable, it being possible for a plug, which is not illustrated further, to be accommodated in said plug receptacle. Said plug can then, in turn, be connected to a corresponding data cable which leads to the controller 18.

The invention claimed is:

1. A sensor for outputting a sensor signal which is dependent on a variable which is to be measured, comprising:
   a measurement pickup which is electrically connected to a data line at a connection point, is housed in a measurement pickup housing and is configured to feed the sensor signal which is dependent on the variable which is to be measured into the data line,
   an installation housing which houses the measurement pickup housing and the data line at least at the connection point and is produced from a flexible material, at least one groove formed on the installation housing to promote bending of the housing, and
   a fastening element, which is fixedly connected to the installation housing, for fastening the installation housing to a sensor receptacle, wherein the measurement pickup housing and the fastening element are arranged on two opposite sides of the installation housing, and
   at least two crushing ribs placed in an axially symmetrical manner surrounding the data line, deformed by the sensor receptacle, and located on the installation housing between the at least one groove and the fastening element.

2. The sensor as claimed in claim 1, wherein the flexible material is an elastomer.

3. The sensor as claimed in claim 2, wherein the elastomer has a Shore A hardness of at least 80.

4. The sensor as claimed in claim 1, wherein the installation housing extends from the measurement pickup housing in a direction of the data line surrounding the data line in the manner of a rod.

5. The sensor as claimed in claim 1, wherein the data line is flexible at least in the region of the connection point.

6. The sensor as claimed in claim 1, wherein the measurement pickup housing is formed from a synthetic resin.

7. A vehicle comprising an axle body which is fastened to a chassis, a wheel which is fastened in a rotatable manner to the axle body by a wheel bearing, and a sensor as claimed in claim 1, the fastening element and the measurement pickup housing of said sensor correspondingly being fastened to the axle body or to an element of the wheel bearing, said element being fixed in position in relation to the axle body.

8. The sensor as claimed in claim 1, wherein the measurement pickup housing is formed from an epoxy resin.

* * * * *